W. E. NORCROSS.
RADIATOR AND HOOD COVER FOR AUTOMOBILES.
APPLICATION FILED APR. 28, 1919.

1,338,693.

Patented May 4, 1920.

Inventor.
Walter E. Norcross
by Heard Smith & Tennant
Attys

UNITED STATES PATENT OFFICE.

WALTER E. NORCROSS, OF DORCHESTER, MASSACHUSETTS, ASSIGNOR TO L. C. CHASE & COMPANY, OF BOSTON, MASSACHUSETTS, A COPARTNERSHIP.

RADIATOR AND HOOD COVER FOR AUTOMOBILES.

1,338,693.  Specification of Letters Patent.  Patented May 4, 1920.

Application filed April 28, 1919. Serial No. 293,166.

*To all whom it may concern:*

Be it known that I, WALTER E. NORCROSS, a citizen of the United States, residing at Dorchester, county of Suffolk, State of Massachusetts, and whose post-office address is 21 Woodward Park street, Dorchester, Massachusetts, have invented an Improvement in Radiator and Hood Covers for Automobiles, of which the following description, in connection with the accompanying drawing, is a specification, like characters on the drawing representing like parts.

This invention relates to a radiator and hood cover for automobiles of the general type employed in cold weather for the purpose of confining the heat in the hood and radiator, and thus securing the efficiency of the operation of the automobile.

The principal object of the invention is so to construct the cover that it will be held snugly in position and be prevented from being blown by the wind or otherwise disturbed from its normal position.

A further object of the invention is to provide the cover in two sections, one for the hood proper, and one for the radiator so that when used together the two sections present a combined radiator and hood cover, and so that the section for the radiator may be used alone when desired and in which the construction is so designed that in whichever way it may be used the cover is held snugly in position.

A further object of the invention is to provide means by which the cover may be readily placed in and removed from its normal position.

The nature and object of the invention will appear more fully from the accompanying descriptions and drawings, and will be particularly pointed out in the claims.

In the drawings—

Figure 1:
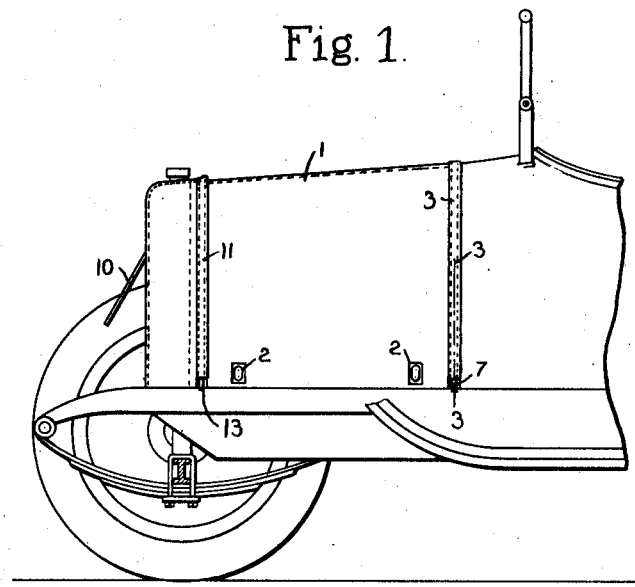
Figure 1 is a side elevation of the forward end of an ordinary type of automobile showing a preferred form of cover embodying the invention in position.

The cover in which this invention is embodied may be made of any suitable fabric such as commonly employed for covering the hoods and radiators of automobiles. It is shown in the drawings as composed of two plies, the inner ply for example being a comparatively thick fabric, and the outer ply being of relatively thin waterproof or water repellent fabric.

The cover is made in two separate sections, one section forming a case covering the hood proper and the other section forming a case covering the radiator proper of the automobile.

The case 1 for the hood is formed to fit over the hood and varies of course in size and shape depending upon the particular type of automobile. At its lower edges it is usually provided with openings 2 to fit over the usual fastening devices by which the hood is locked in place. Along its rear edge the hood case is provided with a pocket 3, and this pocket may conveniently be formed by turning the outer ply material back to form a hem 4 and stitching it by a line of stitching 5. In this pocket 3 thus formed is located a longitudinally elastic flexible member which preferably takes the form of a helical wire spring 6, and which preferably extends throughout the length of the pocket. At its ends this flexible member or spring has secured thereto fastening devices such as hooks 7 adapted to engage with the lower edge of the hood 8. These fastening devices may conveniently be provided with small projecting handles 9 which serve the double purpose of a handle and of a stop to prevent the fastening devices or hooks from being drawn back into the pocket by the resiliency of the spring.

Figure 2:
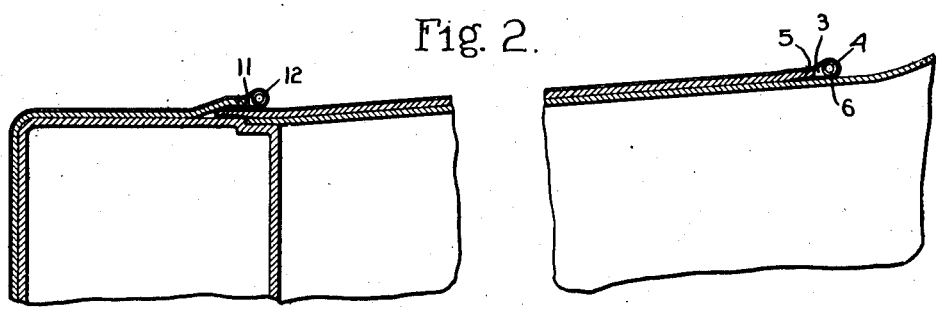
Fig. 2 is a detail in vertical cross section with the central portion broken away, and enlarged of a portion of the construction shown in Fig. 1.
Figure 3:
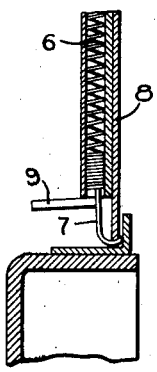
Fig. 3 is a detail enlarged in transverse section taken on the line 3—3 of Fig. 1.

The section or case for the radiator is preferably formed of similar material to that for the hood and is formed to fit over the front, top and sides of the radiator. This radiator case is also preferably provided with the usual front flap 10 and is of sufficient width to lap over the hood case when in place as clearly shown in Fig. 2.

The radiator case is provided along its rear edge with a pocket 11 which may be preferably formed in the manner similar to the pocket 3 in the rear edge of the hood case. In this pocket 11 is located a longitudinally elastic flexible member preferably a helical spring 12 of the same character as employed at the rear edge of the hood case, and this member or spring is provided at its lower end with hooks 13 and handles of the same character as already described.

When it is desired to protect the entire hood and radiator, then both sections or casings are employed, and the rear edge of the radiator case overlying the front edge of the hood case serves to hold the front edge of the hood case in position. When it is desired to protect only the radiator, then the hood case is left off, and the longitudinally elastic flexible member at the rear edge of the radiator case holds the radiator case in position.

It will thus be seen that the entire cover whether employed in one or two sections is held snugly in its position and cannot be blown loose by the wind or shift or be moved from its normal position. The entire cover is readily and easily removed by unhooking the hooks from the bottom of the hood cover.

Having thus described my invention, what I claim as new and desire to secure by Letters Patent is—

1. A radiator cover for automobiles comprising a fabric case formed to fit over the front, top, and sides of the radiator and provided with a pocket along its rear edge, a longitudinally elastic flexible member in said pocket, and fastening devices at the ends of said member engageable with the automobile body when the cover is in place, and acting to hold the member in tension and thus to clamp the rear edge of the case snugly against the body.

2. A radiator cover for automobiles comprising a fabric case formed to fit over the front, top, and sides of the radiator and provided with a pocket along its rear edge, a helical spring in said pocket, and hooks at the ends of said spring engageable with the automobile body when the cover is in place, and acting to hold the spring in tension and thus to clamp the rear edge of the case snugly against the body.

3. A combined radiator and hood cover for automobiles comprising a fabric case formed to fit over the hood and provided with a pocket along its rear edge, a fabric case formed to fit over the front, top, and sides of the radiator and provided with a pocket along its rear edge overlying the front edge of the hood case, longitudinally elastic flexible members in each of said pockets, and fastening devices at the ends of said members engageable with the automobile body when the cover is in place, and acting to hold the members in tension, and thus to clamp the rear edges of the cases snugly against the body.

4. A combined radiator and hood cover for automobiles comprising a fabric case formed to fit over the hood and provided with a pocket along its rear edge, a fabric case formed to fit over the front, top, and sides of the radiator and provided with a pocket along its rear edge overlying the front edge of the hood case, helical springs in said pockets, and hooks at the ends of said springs engageable with the automobile body when the cover is in place, and acting to hold the springs under tension and thus to clamp the rear edges of the cases snugly against the body.

In testimony whereof I have signed my name to this specification.

WALTER E. NORCROSS.